(12) United States Patent
Yokoyama

(10) Patent No.: US 8,418,260 B2
(45) Date of Patent: Apr. 9, 2013

(54) SERVER SYSTEM, SECURITY IMPROVING METHOD OF SERVER AND COMPUTER PROGRAM OF THE SAME

(75) Inventor: Jun Yokoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 414 days.

(21) Appl. No.: 12/724,523

(22) Filed: Mar. 16, 2010

(65) Prior Publication Data

US 2010/0241843 A1  Sep. 23, 2010

(30) Foreign Application Priority Data

Mar. 19, 2009 (JP) .................. P2009-067720

(51) Int. Cl.
*G06F 21/00* (2006.01)
(52) U.S. Cl.
USPC ............................................................ 726/36
(58) Field of Classification Search ......................... None
See application file for complete search history.

(56) References Cited

U.S. PATENT DOCUMENTS

| | | |
|---|---|---|
| 2004/0054904 A1 | 3/2004 | Matsuya |
| 2004/0193883 A1* | 9/2004 | Alperin et al. ............... 713/170 |
| 2008/0244759 A1* | 10/2008 | Cao ................................. 726/34 |
| 2008/0263682 A1* | 10/2008 | Fu .................................. 726/36 |
| 2008/0271122 A1* | 10/2008 | Nolan et al. ...................... 726/4 |

FOREIGN PATENT DOCUMENTS

| | | |
|---|---|---|
| JP | H04199363 A | 7/1992 |
| JP | 2000105622 A | 4/2000 |
| JP | 200486765 A | 3/2004 |
| JP | 2006-172186 A | 6/2006 |
| JP | 2007-299427 A | 11/2007 |
| JP | 2007299247 A | 11/2007 |

OTHER PUBLICATIONS

Japanese Office Action for JP2009-067720 mailed on Feb. 26, 2012.

* cited by examiner

*Primary Examiner* — David Pearson

(57) ABSTRACT

A server system is provided in which it is possible to avoid an improper operation or malicious operation on, for example, a power switch of a server. In such a system, both a management server and multiple servers are connected to a network. Each multiple server includes: an authentication key storing portion which stores an authentication key; and a management module which compares between data inputted by operating the operation switches and the authentication key stored in the authentication key storing portion, wherein the management module sets the operation switches available if the input data and the authentication key are the same. The management module includes a function of writing the authentication key received from the management server into the authentication key storing portion. The management server includes a virtualized environment software which transmits the authentication key to each of the multiple servers via the network.

9 Claims, 2 Drawing Sheets

SERVER SYSTEM, SECURITY IMPROVING METHOD OF SERVER AND COMPUTER PROGRAM OF THE SAME

Priority is claimed on Japanese Patent Application No. 2009-067720, filed on Mar. 19, 2009, the content of which is incorporated herein by reference.

BACKGROUND OF THE INVENTION

1. Field of the Invention

The present invention relates to a facility or building including many servers, for example, a datacenter. In particular, the present invention relates to a server system, a security improving method of a server and a computer program of such a system and method that can avoid improper operations, for example, a malicious (deliberate) operation or a careless operation on a power button, a reset button, and the like, by a person who is not appropriately authorized, and that can avoid, for example, an improper operation on a power button, a reset button, and the like, by a person who is appropriately authorized.

2. Description of Related Art

As is well known, each of many servers installed in, for example, a datacenter has a power button and a reset button on a front surface, and it is possible to turn off or reset the server by operating such buttons regardless of operation status of the server. However, if an operator of the server carelessly turns off or resets the server, such an operation causes a great amount of damage to clients using the server.

Therefore, in a datacenter or such a facility, a solution in which a locking operation is conducted on each of racks is used to avoid operations on the server by a person who is not authorized. However, in many cases, a locking operation is not conducted on each server mounted on such a rack, and it is not possible to avoid an improper operation in which a power button of the server is turned off by mistake when the rack is opened.

Regarding such a problem, various solutions are proposed in which, for example, a physical lock is provided with regard to each server, and authentication by using IC cards with regard to each server. However, if such solutions are applied to the servers, troublesome management operations are necessary with regard to all of many servers, and there is a demerit of increasing cost because new hardware should be physically provided. In addition, for example, in a case in which an administrator of a physical server and an administrator of a user environment is different, and in a case in which many logical servers are integrally managed by using a virtualized environment, it is difficult for a user to recognize a physical server on which an application software is executed, and there is a problem in which it is not possible to sufficiently conduct a management of physical keys.

Further, a portion of products provides an apparatus in which it is possible to select a mode that prohibits a function of a power button in advance. However, in such an apparatus, when the OS (operating system) does not respond to any commands or requests, there is a problem in which there is no solution other than pulling a power cable to forcibly disconnect the server.

As described above, when a virtualized environment is widely spread, for example, in a datacenter in which many servers are generally installed, it is not a practically acceptable solution to protect a power source of a server by using a lock or IC card. There may be a solution of combining a electric key which can be remote-controlled and software. However, in order to avoid a cost of providing such an electric key, it is desirable if it is possible to avoid an improper operation or malicious operation without using a special and physical solution.

SUMMARY OF THE INVENTION

The present invention was conceived in accordance with such a background. The object of the present invention is to provide a server system, a security improving method and a computer program of such a system and method in which it is possible to turn off or reset the server without conducting improper operations even in an urgent case in which a server administrator cannot support, in which it is possible to avoid an operation on a power source of the server by a malicious third person, and in which it is possible to avoid an improper operation or malicious operation without using a special and physical solution.

There are prior art documents that relate to the above-described technical field, for example, Japanese Unexamined Patent Applications, First Publication No. 2006-172186 and No. 2007-299427.

A solution of the above-described object is a server system including: at least one server connected to a network; and a management server connected to the network, wherein said management server includes a transmitting portion which transmits an authentication key to the server via the network, and said server includes: an authentication key storing portion which stores the authentication key; a writing portion which writes the authentication key received from the management server via the network in the authentication key storing portion; and a setting portion which, when data is inputted in accordance with operations on at least one operation switch, compares between the input data and the authentication key stored in the authentication key storing portion, and which conducts a first setting operation that sets the operation switch available when the input data and the authentication key are the same.

Another solution is a security improving method of a server system which includes at least one server connected to a network and a management server connected to the network, including steps of: transmitting an authentication key from the management server to the server via the network; writing the authentication key received from the management server in an authentication key storing portion of the server; generating input data which is inputted in accordance with operations on at least one operation switch; comparing between the input data and the authentication key stored in the authentication key storing portion; and conducting a first setting operation that sets the operation switch available when the input data and the authentication key are the same.

Another solution is a computer program of at least one server of a server system which includes the server connected to a network and a management server connected to the network, including executable instructions for: writing the authentication key received from the management server in an authentication key storing portion of the server; generating input data which is inputted in accordance with operations on at least one operation switch; comparing between the input data and the authentication key stored in the authentication key storing portion; and conducting a first setting operation that sets the operation switch available when the input data and the authentication key are the same.

In accordance with the above-described solutions, there is an advantage that can avoid malicious operations or improper operations on a server. In addition, by notifying only administrators of an authentication key who recognize a server as a specific logical server, it is possible to avoid an improper operation of turning off the server by a person because the person recognizes the server as a usual and physical server. In addition, the above-described solutions can be introduced at a low cost because it is not necessary to newly provide devices or gadgets, for example, a lock and a card reader.

DETAILED DESCRIPTION OF THE INVENTION

Hereinafter, in reference to drawings, an embodiment is explained.

In this embodiment, an authentication key specific to each logical server is transmitted from a management software of a virtualized environment to each physical server. Hereinafter, details are explained.

Figure 1:
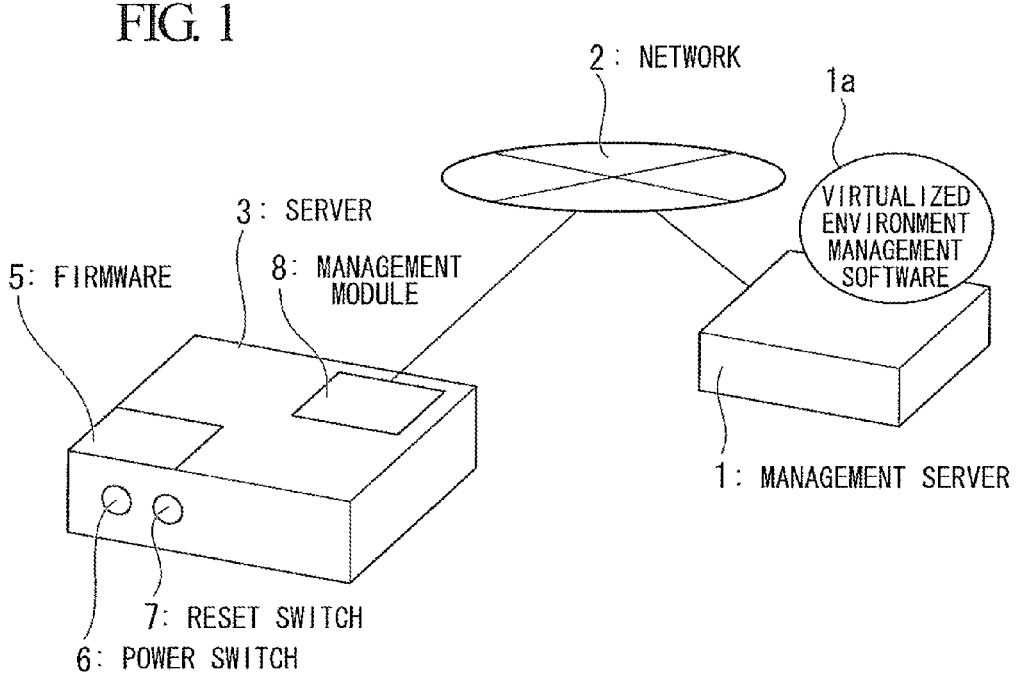
FIG. 1 is a block diagram showing a constitution of a server system of one embodiment.

FIG. 1 is a drawing showing an outline constitution of a server system of one embodiment. It should be noted that, in a practical computer system, many servers are installed, and many clients are connected to the servers via a network. However, the drawings show only one server, and clients are omitted.

In FIG. 1, a reference numeral "1" is a management server (transmission means) which includes a virtualized environment management software 1a and which is connected to a network 2. A reference numeral "3" is a server which includes firmware 5 in a similar manner as generally used servers, and which has a power switch 6 and reset switch 7. In addition, as a characteristic constitution of this embodiment, the server 3 includes both a management module 8 (setting means, writing means) which monitors and checks physical operations on the server 3 and an authentication key storing portion (not shown in the drawings).

The management module 8 receives input signals which are generated, for example, as a number of operations of pressing down on the power switch 6 by an operator, and the management module 8 recognizes the input signals as an input of an authentication key. The management module 8 includes a means that transits the server to an unlocked mode when the inputted authentication key is recognized as "OK", a means that stores an authentication key transmitted by an external management server 1 in an authentication key storing portion, and a means that removes the authentication key stored in the authentication key storing portion. In, for example, a virtualized environment, there is a precondition in which one physical server is commonly used between a multiple user environment, and in such an environment, it is possible to store multiple authorization keys. Further, if the server 3 is not transited to an unlocked mode, the server 3 is in a protected mode in which functions of, for example, turning off the power by using the power switch 6 and resetting the server by using the reset switch 7, that are initially provided cannot be available. In addition, the server 3 or the management module 8 has a function of transiting the server 3 to the protected mode when a predetermined time interval has passed after transition to the unlocked mode and/or when accepting one command or operation.

The virtualized environment management software 1a which is generally used is executed on the management server 1. The virtualized environment management software 1a which is generally used has information that can be used for identifying the physical server 3 on which a logical server is operating. Further, the virtualized environment management software 1a conducts a management operation on the physical server 3 to assign a logical server by using generally used methods. In addition, in a constitution of this embodiment, the environment management software 1a has a table for managing the authentication key corresponding to each of the logical servers and has a function to refer to the table. Further, the environment management software 1a has both a function of transmitting an authentication key when assigning a logical server to the physical server 3 and a function of requesting for removal of the authentication key when removing the logical server from the physical server 3.

Figure 2:
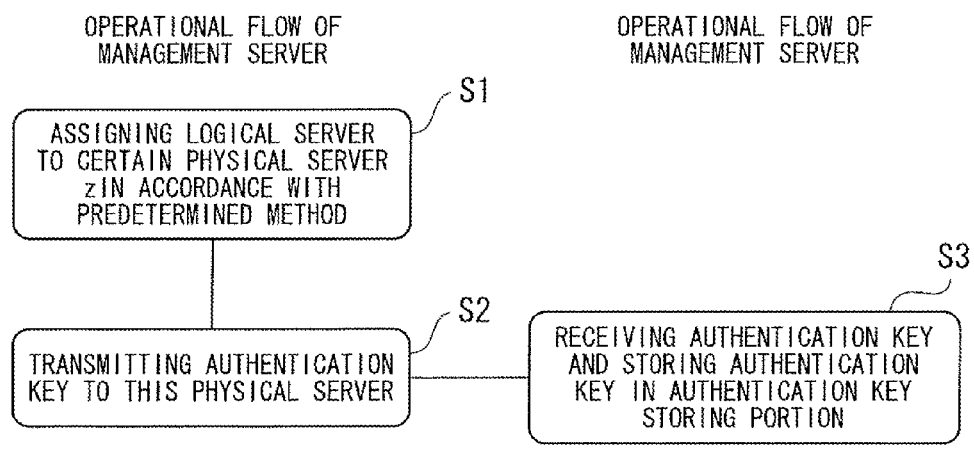
FIG. 2 is a flowchart that describes operations of the server system.
Figure 3:
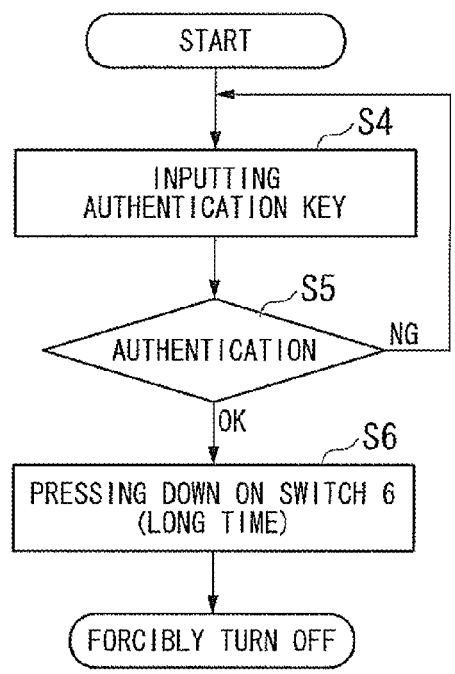
FIG. 3 is a flowchart that describes operations of the server system.

Hereinafter, operations of this embodiment are explained. FIGS. 2 and 3 show an operational flow of this embodiment. First, in reference to FIG. 2, an operational flow of transmitting and removing the authentication key is explained. The virtualized environment management software 1a has a function of assigning/transporting/removing a virtualized server to and from the physical server 3. When a logical server (virtual server) is assigned to the physical server 3 (Step S1 of FIG. 2), the virtualized environment management software 1a reads an authentication key corresponding to the virtual server and transmits the authentication key to the physical server 3 to which the virtual server is assigned (Step S2). After receiving the authentication key, the physical server 3 registers the authentication key of the virtual server to the authentication key storing portion (Step S3). Further, when the virtualized environment management software 1a transports/removes the logical server which is assigned to the physical server, the virtualized environment management software 1a conducts a transport/removal operation of the logical server in accordance with a general method and requests the physical server 3 for removing the authentication key corresponding to the logical server from the physical server 3. After receiving such a request, the physical server 3 removes the authentication key from the authentication key storing portion. When transporting the logical server, in the same manner as a new registration, the virtualized environment management software 1a transmits the authentication key to another server which is a transportation destination and requests the server for storing the authentication key.

Figure 4:
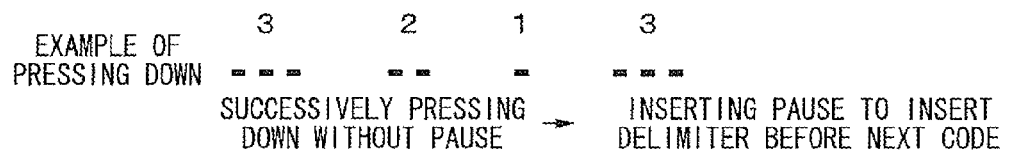
FIG. 4 is a drawing that explains an operation example of a power switch shown in FIG. 1.

Hereinafter, in reference to FIGS. 3 and 4, operations of using the authentication key by the physical server are explained. First, when the authentication key is stored in the authentication key storing portion of the server 3, the server 3 is in a protected mode, that is, the server 3 is in a condition in which any operation on the power switch 6 or the reset switch 7 is not acceptable. However, if the server 3 is in a condition, for example, in which the authentication key is not stored in the authentication key storing portion because the server 3 is in a initial state, and in which all authentication keys are removed, the server 3 is not in the protected mode and can be operated by pressing keys in the same manner as generally used servers.

When the server 3 is in the protected mode, if an operator who is authorized turns off the server 3, first, the operator inputs the authentication key by pressing the power switch 6 (Step S4). For example, as shown in FIG. 4, if the authentication key is for example, "3213", the operator presses down on the power switch 6 three times successively without pause, then after a short pause, presses down on the power switch 6 two times successively without pause, followed by another short pause, presses down on the power switch 6 one time, again followed by a short pause and finally presses down on the power switch 6 three times successively without pause.

When such an operation is conducted, the management module 8 of the server 3 recognizes that an authentication key which is "3213" is received and compares the authentication key stored in the authentication key storing portion to the received authentication key (Step S5). After this, if these authentication keys are different (authentication NOT_OK), the server 3 waits for an input operation of the authentication key again. On the other hand, if these authentication keys are the same (authentication OK), the server 3 transits to a non-protected mode (unlocked mode). After this, in the same manner as the generally used servers, the power switch 6 works as a power switch, the reset switch 7 works as a reset switch, and it is possible to conduct a turn off of the power by operating the power switch 6 (Step S6). Further, when a predetermined time interval has passed after transition to the non-protected mode, the server 3 automatically transits to the protected mode.

In the above-described embodiment, only the power switch 6 is operated when inputting the authentication key. However, it should be noted that it is possible to apply a predetermined pattern of operations on both the power switch 6 and the reset switch 7.

In accordance with the above-described embodiment, a person, for example, a malicious operator or an administrator of another server who does not know the authentication key, cannot operate the power switch 6 of the server, and it is possible to avoid malicious operations and improper operations. Further, if the authentication key is notified to only administrators who recognize the server as a logical server, it is possible to avoid improper operations of turning off the server due to an improper recognition in which the server is recognized as a usual physical server. Further, the above-described embodiment can be introduced at a low cost because it is not necessary to newly provide devices or gadgets, for example, a lock and a card reader. Further, it is possible to provide an environment that enables turning off or reset of the server even in an urgent case in which a server administrator cannot support while avoiding both human-caused mistakes and malicious tricks by a third person.

The above-described embodiment is mainly applied to a facility or building including many servers, for example, a datacenter.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A server system comprising:
    at least one server connected to a network; and
    a management server connected to the network, wherein
    said management server comprises a transmitting portion which transmits an authentication key to the server via the network, and said server comprises:
        an authentication key storing portion which stores the authentication key;
        a writing portion which writes the authentication key received from the management server via the network in the authentication key storing portion; and
        a setting portion which, when data is inputted in accordance with operations on at least one operation switch, compares between the input data and the authentication key stored in the authentication key storing portion, and which conducts a first setting operation that sets the operation switch available when the input data and the authentication key are the same, wherein
    said operation switch is a power switch or a reset switch.

2. A server system according to claim 1, wherein said setting portion conducts a second setting operation that sets the operation switch available if the authentication key is not stored in the authentication key storing portion.

3. A server system according to claim 1, wherein said setting portion conducts a third setting operation that sets the operation switch unavailable if a predetermined time interval has passed after setting the operation switch available or if one operation is accepted after setting the operation switch available.

4. A security improving method of a server system which includes at least one server connected to a network and a management server connected to the network, comprising steps of:
    transmitting an authentication key from the management server to the server via the network;
    writing the authentication key received from the management server in an authentication key storing portion of the server;
    generating input data which is inputted in accordance with operations on at least one operation switch;
    comparing between the input data and the authentication key stored in the authentication key storing portion; and
    conducting a first setting operation that sets the operation switch available when the input data and the authentication key are the same, wherein
    said operation switch is a power switch or a reset switch.

5. A security improving method of a server system according to claim 4, further comprising steps of:
    conducting a second setting operation by the server that sets the operation switch available if the authentication key is not stored in the authentication key storing portion.

6. A security improving method of a server system according to claim 4, further comprising steps of:
    conducting a third setting operation by the server that sets the operation switch unavailable if a predetermined time interval has passed after setting the operation switch available or if one operation is accepted after setting the operation switch available.

7. A computer program which is stored on a non-transitory computer readable medium of at least one server of a server system which includes the server connected to a network and a management server connected to the network, comprising executable instructions for:
    writing the authentication key received from the management server in an authentication key storing portion of the server;
    generating input data which is inputted in accordance with operations on at least one operation switch;
    comparing between the input data and the authentication key stored in the authentication key storing portion; and
    conducting a first setting operation that sets the operation switch available when the input data and the authentication key are the same, wherein
    said operation switch is a power switch or a reset switch.

8. A computer program according to claim 7, further comprising steps of:

conducting a second setting operation that sets the operation switch available if the authentication key is not stored in the authentication key storing portion.

9. A computer program according to claim 7, further comprising steps of:
conducting a third setting operation that sets the operation switch unavailable if a predetermined time interval has passed after setting the operation switch available or if one operation is accepted after setting the operation switch available.

* * * * *